(12) United States Patent
Wieding et al.

(10) Patent No.: US 7,988,091 B2
(45) Date of Patent: Aug. 2, 2011

(54) LUGGAGE COMPARTMENT ACTUATION

(75) Inventors: Olaf Von Wieding, Neuenkirchen (DE);
Lars Rowold, Wiefelstede (DE); Bodo Wisch, Bremen (DE); Bruno Alquier, Blagnac (FR)

(73) Assignees: Airbus Deutschland GmbH (DE);
Airbus Societe Par Actions Simplifiees (FR)

( * ) Notice: Subject to any disclaimer, the term of this patent is extended or adjusted under 35 U.S.C. 154(b) by 771 days.

(21) Appl. No.: 11/630,308

(22) PCT Filed: Jun. 14, 2005

(86) PCT No.: PCT/EP2005/006367
§ 371 (c)(1),
(2), (4) Date: Apr. 21, 2008

(87) PCT Pub. No.: WO2005/123506
PCT Pub. Date: Dec. 29, 2005

(65) Prior Publication Data
US 2008/0295407 A1  Dec. 4, 2008

Related U.S. Application Data

(60) Provisional application No. 60/591,883, filed on Jul. 29, 2004.

(30) Foreign Application Priority Data

Jun. 22, 2004  (FR) ..................... 04 06778

(51) Int. Cl.
*B64D 11/00* (2006.01)
(52) U.S. Cl. ........................ 244/118.5; 49/32
(58) Field of Classification Search .............. 244/118.1, 244/118.5; 49/32
See application file for complete search history.

(56) References Cited

U.S. PATENT DOCUMENTS

| 4,492,949 | A | 1/1985 | Peterson et al. |
| 5,441,218 | A * | 8/1995 | Mueller et al. ............. 244/118.1 |
| 5,567,028 | A | 10/1996 | Lutovsky et al. |
| 6,316,846 | B1 | 11/2001 | Kashiwazaki et al. |
| 6,598,829 | B2 | 7/2003 | Kamstra |
| 6,691,951 | B2 | 2/2004 | Frazier |
| 7,726,606 | B2 * | 6/2010 | Graf et al. ................. 244/118.5 |
| 2005/0073507 | A1 | 4/2005 | Richter et al. |
| 2005/0230541 | A1 | 10/2005 | Graf et al. |

FOREIGN PATENT DOCUMENTS

DE  43 35 151 A1  4/1995

(Continued)

OTHER PUBLICATIONS

Park et al. "Single Carbon Fibre as a Sensing Element in Pressure Sensors", Applied Physics Letters vol. 89. 2006.

*Primary Examiner* — Tien Dinh
*Assistant Examiner* — Michael Kreiner
(74) *Attorney, Agent, or Firm* — Lerner, David, Littenberg, Krumholz & Mentlik, LLP

(57) ABSTRACT

This device is provided for a luggage compartment designed to be placed overhead. The compartment comprises a mobile part (4) between an open position and a closed position and a mechanism for acting on said mobile part (4) to promote its closing. Said mobile part (4) presents an opening (14) designed for introducing and retrieving luggage as well as a lower exterior surface (12). The control device comprises detection means reacting when pressure is exerted on a predetermined zone of the lower exterior surface (12) of the mobile part (4) as well as for sending a control signal to the mechanism acting on the mobile part (4) to close the part when pressure is exerted on said detection means. The detection means are disposed at the lower exterior surface (12) of the mobile part (4).

13 Claims, 4 Drawing Sheets

FOREIGN PATENT DOCUMENTS

| | | |
|---|---|---|
| DE | 102 22 123 A1 | 11/2003 |
| EP | 1 116 651 A2 | 7/2001 |
| EP | 1 249 392 A1 | 10/2002 |
| JP | 2003-215180 A | 7/2003 |
| RU | 2120117 C1 | 10/1998 |
| WO | 94/05988 A1 | 3/1994 |
| WO | WO-95/18040 A1 | 7/1995 |

* cited by examiner

LUGGAGE COMPARTMENT ACTUATION

This application claims the benefit of the filing date of U.S. Provisional Patent Application No. 60/591,883 filed Jul. 29, 2004, the disclosure of which is hereby incorporated herein by reference and of French Patent Application No. 0406778 filed Jun. 22, 2004, the disclosure of which is hereby incorporated herein by reference.

The present invention relates to a control device for closing a luggage compartment. More particularly, the invention relates to luggage compartments that are available for passengers in an aircraft. However, the invention may also be applied to other types of passenger transport vehicles (e.g. trains, buses, boats).

It is customary to place luggage in luggage compartments that are arranged overhead. This solution avoids using just the floor for stowing luggage by utilizing space that generally goes unused.

In certain configurations, particularly in aircraft, the luggage compartment comprises a mobile bin designed to receive luggage to be stowed. This bin may be moved between an open low position allowing access to the inside of the bin and a closed top position. The luggage is then placed in the bin when the latter is in a low position and then is pushed upward towards its closing position. When closing the bin, one has to push the bin and the entire load contained therein upward to bring it to a closed position.

Actuated luggage compartments may allow the luggage bins to be easily moved from the open position to the closed position and to brake this bin upon opening the luggage compartment. However, the control of such luggage bins may not be natural to the user since it is totally different from manual luggage compartments, whether assisted by a gas cylinder or not. In some cases, this may be cumbersome for the user. Thus, for example, if the user has forgotten to place a piece of luggage in the luggage compartment and notices this during the closing of the compartment, with a motorized compartment he may have to wait for the compartment to close and then reopen the compartment so that he can place the forgotten piece of luggage inside the compartment. With a manually controlled compartment, once the passenger notices that he has forgotten to place a piece of luggage inside the compartment, he releases the compartment which then opens immediately.

It is an object of the present invention to provide for an improved control device for a luggage compartment.

According to an exemplary embodiment of the present invention a control device for closing a luggage compartment is provided, the control device comprising a control mechanism, a mobile part and a detection unit adapted to detect a first event triggered by a user and to transmit a first control signal to the control mechanism, wherein the first control signal corresponds to the first event, wherein the control mechanism is adapted to close the mobile part, and wherein closing of the luggage compartment is triggered by the first control signal.

According to an other exemplary embodiment of the present invention, the first event is one of a pressure signal applied to a zone and an approach of a user. Furthermore, the mobile part comprises an opening for loading luggage and a lower outside surface, wherein the zone corresponds to the lower outside surface of the mobile part, and wherein the detection unit is arranged at a level corresponding to the lower outside surface of the mobile part.

According to an other exemplary embodiment of the present invention, the detection unit is further adapted to detect a second event and to transmit a second control signal to the mechanism, wherein the second control signal corresponds to the second event applied to the zone, wherein the mechanism is further adapted to open the luggage compartment, and wherein opening of the luggage compartment is triggered by the second control signal.

It should be noted, that the first or second event may be a pressure signal or a pull signal or, e.g., a sequence of single individual pressure signals.

The control device may send a control signal as pressure is exerted on the detection unit. Once the pressure (equivalent to a force) stops, the signal is modified and the mechanism for assisting the closing may take this into account. Thus, the assist mechanism may be driven in such a way that the luggage compartment, or more precisely its mobile part, reacts "naturally": when no pressure is exerted on the mobile part of the luggage compartment, the mechanism assisting in the closing may be disengaged. In this way, the luggage compartment may react in the same way as when a user stops pushing on a "manual" luggage compartment and it opens again.

To have more ergonomic control means, the detection unit advantageously extends longitudinally with relation to the opening of the mobile part on a length corresponding to at least half of the width of the luggage compartment and is found near the opening of the mobile part of the latter. The detection means are then found on the mobile part at the location where a user naturally attempts to push the luggage compartment closed.

The detection unit comprises, for example, a pressure sensor chosen from among a set of resistive sensors and capacitive sensors.

According to an exemplary embodiment, the detection unit is for example disposed at the bottom of a groove, and a rest bar is elastically mounted in the groove in such a way that it acts on the detection means when pressure is exerted on it. The rest bar is presented for example in the form of a roughly rectangular section shaped piece with an interior surface designed to act on the detection means, an exterior surface opposite from the interior surface on which a user may exert pressure and two lateral surfaces, the lateral surfaces each having a flange extending longitudinally, and the sides of the groove receiving the rest bar each present a housing in which a flange of the rest bar is positioned.

In this exemplary embodiment, a printed circuit is for example housed at the bottom of the groove, and the interior surface of the rest bar is conductive, the conductive surface being at a distance from the printed circuit when no pressure is exerted on the rest bar.

In an other exemplary embodiment of the present invention, the detection means cover for example the major part of the lower exterior surface of the mobile part. Then they are present in the form of a film. This latter is, in a variation of the embodiment, electrically insulated from the lower exterior surface of the mobile part by a layer of insulating material and is covered by a decorative layer.

The present invention also relates to a luggage compartment designed to be placed overhead, this compartment comprising a mobile part between an open position and a closed position and a mechanism for acting on said mobile part to promote its closing, characterized in that the invention comprises a control device such as described above to act on said mechanism.

According to another exemplary embodiment of the present invention, a detection unit for integration in a luggage compartment of an airplane is provided, the detection unit comprising a capacitive sensor with an active layer, wherein the capacitive sensor is adapted to detect an event triggered by a user. The detection unit is adapted to transmit a first control signal to a control mechanism, wherein the first control signal corresponds to the first event.

According to this exemplary embodiment of the present invention, the capacitive sensor may be completely integrated into the luggage compartment hatrack. If the capacitive sensor now detects an event which is triggered by a user, such as, for example, a particular user movement, a corresponding control signal is transmitted to the control mechanism. According to an aspect of the present invention, the control mechanism may then help the user to open or to close the luggage compartment.

According to another exemplary embodiment of the present invention, the detection unit further comprises a circuit adapted for providing a voltage to the capacitive sensor and for analyzing an electric field generated by the capacitive sensor, wherein the electric field corresponds to the event triggered by the user. Therefore, the circuit may be adapted for determining whether a corresponding user activity or event has occurred. For example, the circuit may be calibrated or even programmed such that a specific event can be clearly identified as, for example, a user's intention to close the luggage compartment. On the other hand, the circuit may be further calibrated or programmed to detect and identify a second event corresponding to the user's intention to open the luggage compartment. It should be noted, that the sensitivity of the capacitive sensor in combination with the circuit may be tuned individually according to individual requirements for its application.

According to another exemplary embodiment of the present invention, the event is one of a pressure signal applied to a zone and an approach of a user.

Therefore, the sensor may detect pressure applied to a certain area of the luggage compartment by detecting a change in capacitance. Furthermore, the circuit may be calibrated such that not only a pressure signal may be detected, but even an approach of, for example, a user's hand to the zone of the luggage compartment, resulting in the change of capacitance.

According to another exemplary embodiment of the present invention, the active layer is a conductive material, which is electrically isolated from a surrounding compartment structure.

Furthermore, the active layer may comprise carbon fibre, aluminium or copper foil or a copper or aluminium web or grid material.

The use of carbon fibre as active layer may result in an easy and cost efficient integration of the detection unit into the luggage compartment.

According to another exemplary embodiment of the present invention, the use of a detection unit for a control device for closing a luggage compartment in an airplane is provided.

These and other aspects of the present invention will become readily apparent from and elucidated with reference to the embodiments described hereinafter.

Exemplary embodiments of the present invention will be described in the following, with reference to the following drawings.

Figure 1:
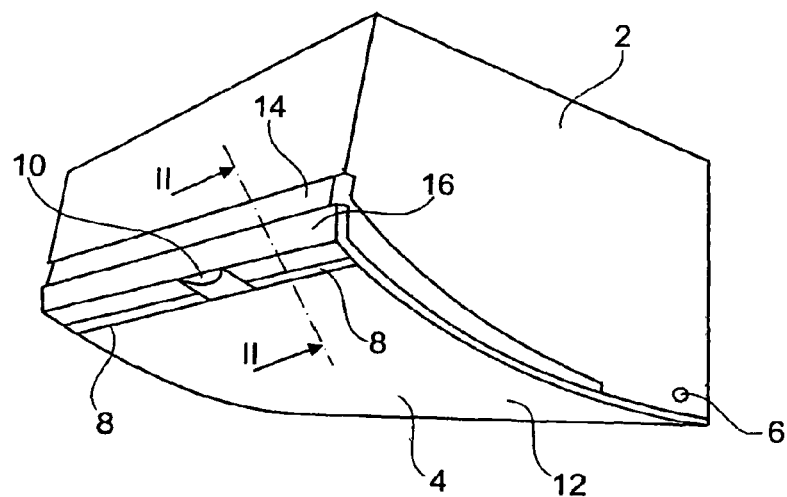
FIG. 1 shows a luggage compartment according to an exemplary embodiment of the present invention.

FIG. 1 represents a luggage compartment designed to be placed overhead in an aircraft (or in another passenger transport vehicle). Conventionally, this luggage compartment comprises a fixed box 2 and a mobile part 4 between a closed position in which it is completely inside the fixed box 2 and an open position in which it is projected out of this box 2.

One may suppose for example that the mobile part 4 passes from its open position to the closed position by pivoting around an axis 6 that is roughly horizontal. Other movements are of course possible. A mechanism that is not shown provides assistance first during the opening of the luggage compartment and secondly during its closing.

During the opening of the luggage compartment, particularly when the latter is loaded, one has to prevent the mobile part 4 from falling suddenly. In fact, this may create impacts that in time damage the luggage compartment and may also cause the luggage inside the compartment to fall. During closing of the luggage compartment, the assist mechanism provides a force that is opposed to the weight of the mobile part 4 and the luggage that it contains. In fact, to pass from the open position to the closed position, the mobile part 4 passes from a low position to a high position and thus the force of gravity is opposed to this movement.

The assist mechanism is, according to an exemplary embodiment, a motor that is used either to brake the lowering of the mobile part 4 or to drive the mobile part in a raising movement. This mechanism may also be a passive mechanism comprising one or more assist cylinders.

The following description particularly relates to the control means for acting on the assist mechanism equipping the luggage compartment during the closing of this compartment.

In FIG. 1, a linear control zone 8 is disposed on both sides of a handle 10. The latter is conventionally used for releasing the mobile part 4 with relation to the fixed box 2 and for thus controlling the opening of the luggage compartment.

The mobile part 4 is presented in the form of a bin in which luggage may be introduced. This bin slides (or pivots) with relation to the fixed box 2. This bin comprises a bottom wall that forms the lower surface 12 of the mobile part 4, and also the luggage compartment. The mobile part 4 also presents an opening 14 for allowing the introduction and retrieval of luggage to be stowed. In the closed position of the luggage compartment, the opening 14 is entirely retracted within the fixed box 2. In the open position of the luggage compartment, the passenger has access to the opening 14 for introducing or retrieving his luggage into or from said compartment. FIG. 1 represents the luggage compartment in a half open position. One also notices in FIGS. 1 and 2 the presence of an edge 16. The latter is disposed at the bottom of opening 14 for obstructing the fall of objects out of the luggage compartment when the latter is particularly in an open position. This edge 16 extends along the lower surface 12 of the mobile part. The handle 10 is conventionally centered with relation to the mobile part 4 of the luggage compartment near the edge 16 and the opening 14.

Figure 2:
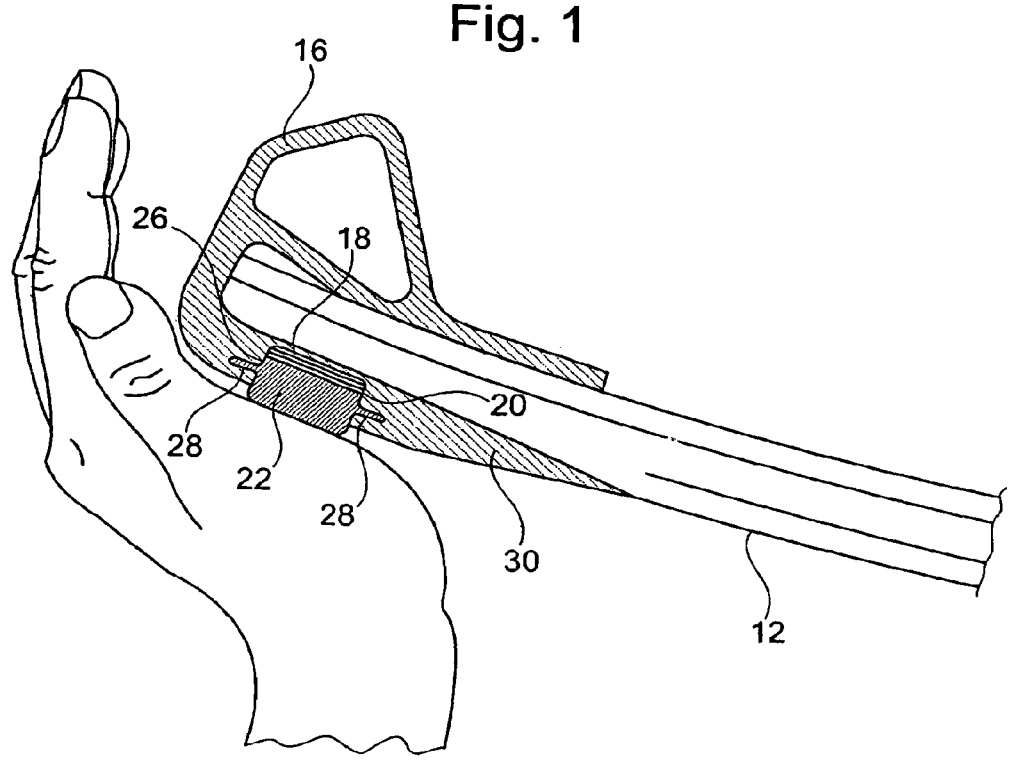
FIG. 2 shows an enlarged sectional view according to section line II-II of FIG. 1, a hand of a user also being represented in this view.
Figure 3:
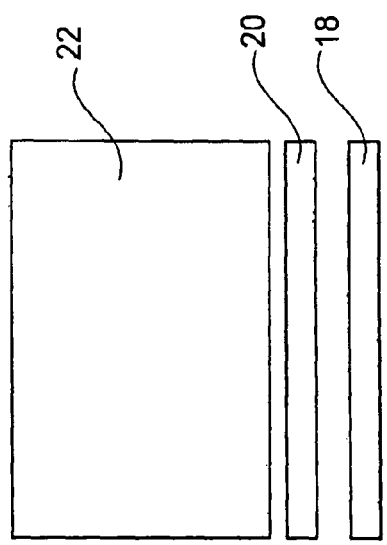
FIG. 3 shows a schematic section of a control device according to the invention, this section corresponding to the section line III-III of FIG. 4.
Figure 4:
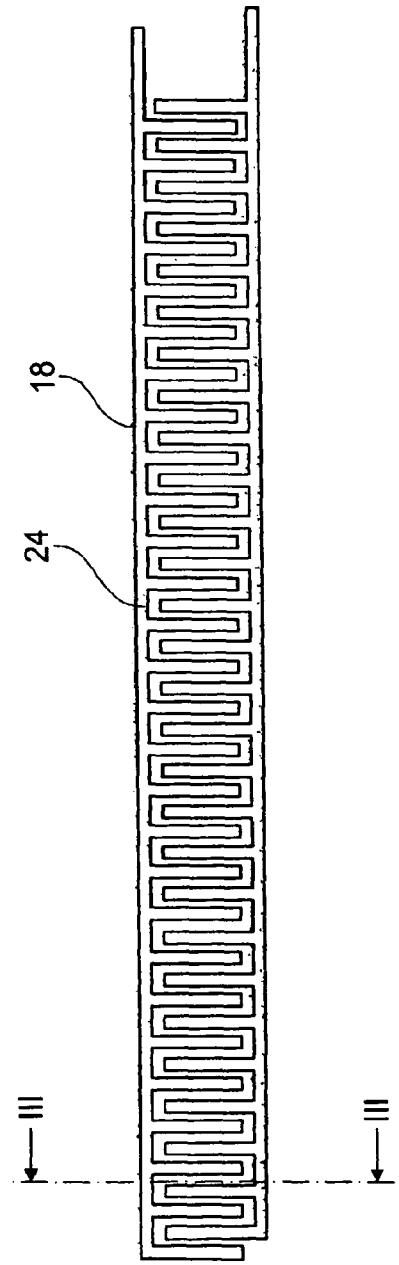
FIG. 4 shows a printed circuit utilized in the control device represented in FIG. 3.

In an exemplary embodiment represented in particular in FIGS. 2 to 4, the control means of the mechanism are disposed at the linear zones 8 found on both sides of the handle 10. These linear zones 8 extend roughly parallel to edge 16.

The control means comprise a printed circuit 18, a conductive element 20 and a rest bar 22.

FIG. 3 schematically shows these elements. The conductive element 20 is fixed on the rest bar 22, for example by bonding, and faces the printed circuit 18. In a position of rest, when no pressure is exerted on the rest bar 22, the conductive element 20 is at a distance from the printed circuit 18. There is no contact between these two elements. On the other hand, when pressure is exerted on the rest bar 22, in the direction of the printed circuit 18, the conductive element 20 is driven by the rest bar 22 and comes into contact with the printed circuit 18. This contact is then detected by electronic means that are not represented and an electric signal is sent to the assist mechanism.

The conductive element 20 is presented for example in the form of a rectangular band whose dimensions roughly correspond to those of the printed circuit 18, which is also rectangular. The element is for example made of carbon or a carbon base. Other conductive materials may also be possible here for making this conductive element 20.

The printed circuit 18 is represented in a top view in FIG. 4. One notices that this printed circuit 18 comprises a track 24 in the shape of squared notches extending over the entire length of the printed circuit 18. As can be seen in FIG. 2, the printed circuit 18 is positioned at the bottom of a groove 26 achieved in the lower surface 12 of the mobile part 4. This groove 26 is achieved in the exterior side of the lower surface 12. The rest bar 22 closes the groove 26 and slightly projects outside of the groove.

To maintain the conductive element 20 at a distance from the printed circuit 18 in a position of rest, the rest bar 22 presents lateral flanges 28. These flanges are positioned in the corresponding housings provided in the lateral sides of the corresponding groove 26.

The rest bar 22 is a shaped piece, made from an insulating material, for example a synthetic material, and presents an interior surface that carries the conductive element 20, an exterior surface that projects out of the groove 26 and two longitudinal lateral surfaces. The flanges 22 are carried by the longitudinal lateral surfaces and extend roughly perpendicularly to the latter. The lateral flanges 28 are positioned on the rest bar 22 and the corresponding housings are achieved in the sides of the groove 26 in such a way that when the lateral flanges 28 are in place in their housings, the conductive element 20 is maintained at a distance (on the order of mm or tenths of mm) from the printed circuit 18.

As shown in FIG. 2, the groove 26 may be achieved in a piece 30 that is positioned on the free extremity of the lower surface 12 of the mobile part 4. This piece 30 may fit into this free extremity, on the side of the opening 14, or may be molded over. The piece may also integrate for example the edge 16 described previously.

The action on the control means described above may be done very naturally. When a passenger has placed his luggage in the luggage compartment (in an open position) he pushes on the lower surface 12 of the mobile part to close the luggage compartment. Furthermore, he naturally pushes on the side opposite to the pivot axis 6 of the mobile part 4, even more so as this zone of the lower surface 12 is the zone that is normally the closest and most accessible to him. Thus, by naturally pushing on the mobile part 4 of the luggage compartment to close the compartment, the passenger (or the personnel on board or any other person) acts on the control means of the assist mechanism. An electric signal is then sent by the control means. An electronic box (not represented) receives this signal and consequently controls the assist mechanism. Once the passenger (or other person) stops pressing on the rest bar 22, the electric signal emitted by the means described above is interrupted. The electronic box may take this information into account. This modification in the signal may be interpreted as the will of the user to stop the closing movement of the luggage compartment. The mechanism may then react in various ways. It may for example release the mobile part 4 in the position in which it is found when the contact on the rest bar 22 has stopped. It may also provide at this time the reopening of the luggage compartment. In some conditions, a closing may also possibly be considered (for example at the end of the contact when the luggage compartment is practically closed).

Figure 5:
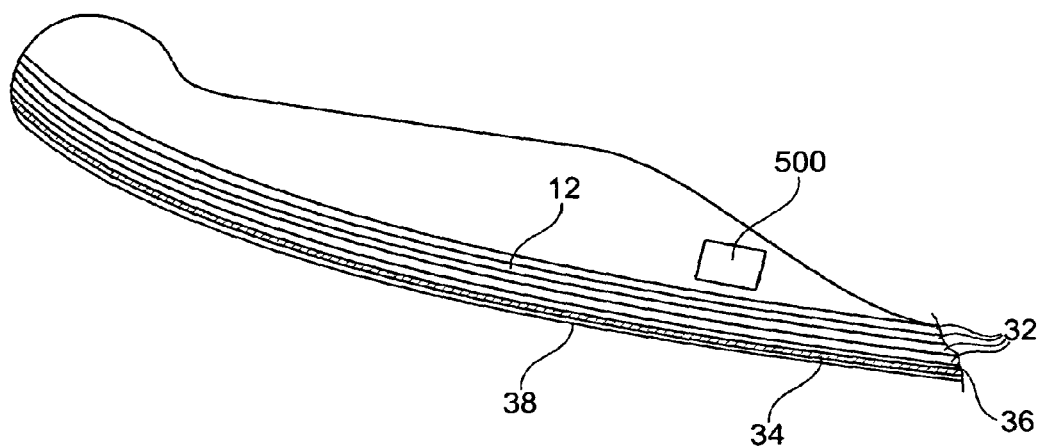
FIG. 5 shows a sectional view in a different scale, corresponding to the view of FIG. 2 (without the hand) for a variation of an embodiment of the invention.

In another embodiment, the capacitive sensor 34 of the detection unit entirely covers the lower surface 12 as shown in FIG. 5, which is a sectional view of the lower surface 12 of the mobile part 4.

In the embodiment shown in the drawing, this lower surface 12 is constructed of carbon. The surface comprises several layers 32 in a carbon fiber based composite material. The exterior side of the lower surface 12 is covered by the capacitive pressure sensor 34 presented in the form of a sheet. the sensor 34 is electrically coupled to a circuit 500 adapted for providing a voltage to the capacitive sensor and for analyzing an electric field generated by the capacitive sensor, wherein the electric field corresponds to the event.

As the lower surface 12 of the mobile part 4 is constructed of a conductive material (e.g. carbon or any other conductive material, e.g. copper), it has to be insulated electrically from the capacitive sensor 34 of this lower surface 12. Also, the conductive material may be a foil, layer or grid made of a metal such as aluminium or copper. This isolation may be achieved by placing a fibreglass based insulating film 36 between the lower surface 12 and the capacitive sensor 34. Furthermore, e.g. for reasons of protection or for aesthetic reasons, the capacitive sensor 34 is covered by a decorative film 38. This film 38 may present various appearances. For example, it may be made of a fabric that matches the seats of the vehicle in which the luggage compartment is located, a synthetic material, etc.

Figure 6:
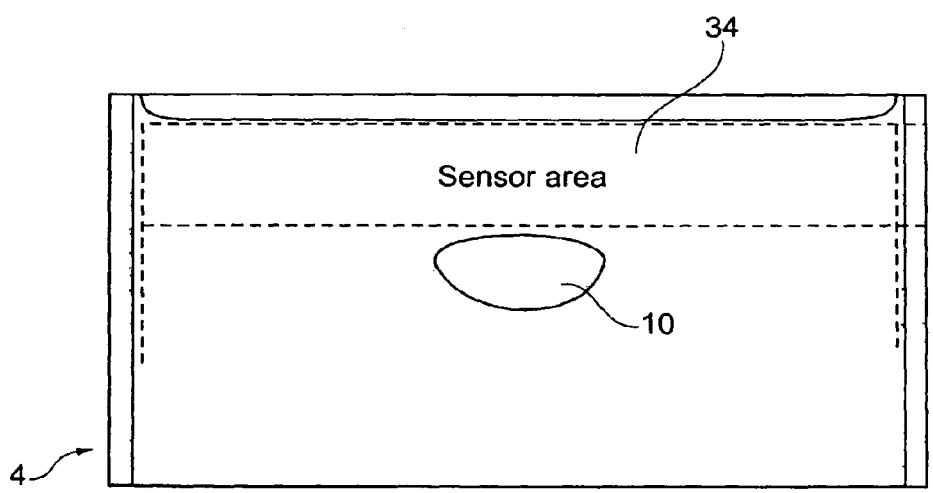
FIG. 6 shows a plan view of the mobile part of a luggage compartment comprising a capacitive sensor.

FIG. 6 shows a plan view of the mobile part of a luggage compartment comprising a capacitive sensor 34, which is integrated into the mobile part 4. According to this exemplary embodiment of the present invention, the capacitive sensor 34 may cover a considerable fraction of the exterior side of the lower surface, e.g. an area of 114 cm×16 cm. The circuit 500 may, e.g., be arranged behind the handle 10.

However, the capacitive sensor 34 may even cover the entire exterior side of the lower surface 12 (except at the handle 10).

As soon as a user touches the lower surface 12 of the exterior side or as soon as the user approaches the capacitive sensor 34, this event is detected and a corresponding electric signal is sent to an electronic box 500 utilized for managing the control mechanism which assists for moving the mobile part 4. Here, an operation may be provided that is similar to the operation described with respect to the first embodiment of the control device. This may allow for example for a closing of the luggage compartment by applying a minimum force. Therefore, the user may be able to close the luggage compartment with his fingertips alone.

It should be noted, that the moving speed with which the control mechanism moves the mobile part may depend on the amount of pressure applied be the user. For example, small pressure may result in a small closing speed an a big pressure may result in a high closing speed of the luggage compartment.

However, the detection unit, which comprises the capacitive sensor 34, may further be adapted to detect a second event, corresponding to the user's intention to open the luggage compartment. This event may, for example, be a certain sequence of single pressure strokes or a sequence of approaches of the user's hand. For example, one short stroke may trigger the closing of the luggage compartment and two short strokes may trigger the opening of the luggage compartment. Therefore, the capacitive sensor 34 may comprise an active layer integrated into the bin-material of the luggage compartment. The active layer may comprise a conductive material, e.g. copper or carbon fibre, and may be electrically isolated with respect to the compartment structure.

According to an exemplary embodiment of the present invention, a carbon fibre material may be used as active layer, since carbon fibre may be used as a building material of other parts of the luggage compartment as well.

Using carbon fibre as active material layer may result in a homogeneous material composition of the luggage compartment structure, such that the sensor is not visible from the outside. Therefore, such sensors may be integrated into a cabin structure of the airplane without being visible. Thus, the cabin design may not be negatively influenced by the sensor integration.

The detection unit may further comprise a circuit 500 adapted for providing a voltage to the capacitive sensor 34 and for analyzing an electrical field generated by the capacitive sensor 34. The circuit 500 may be adapted in form of an integrated circuit or any other circuit adapted for supplying the capacitive sensor 34 with electricity and analyzing respective detection signals.

The active layer may be electrically coupled to the circuit box 500. Use of the detection unit comprising a capacitive sensor described above may provide for an intelligent switch which can easily be integrated into the cabin structure during its fabrication process. By isolating the sensor from its surrounding structure, e.g. by using glass fiber mats surrounding the sensor, the power required for generating the electric field may be reduced to a minimum. Thus, the electromagnetic compatibility may be further improved.

During fabrication of the active sensor layer 34, the active sensor layer 34 is embedded between one or a plurality of glass fibre mats, in order to electrically isolate the active layer 34 from the surrounding structure. According to an aspect of the present invention, the sensor layer 34 is the first layer after the isolating layer. However, the sequence of isolating layers and active layers may be varied according to electronic or sensitivity considerations. For example, if it is desirable to have a sensor layer on each surface of the mobile part (i.e. the inner surface and the outer surface), two sensor layers may be implemented, electrically isolated by a glass fibre mat, resulting in a sandwich of two active layers with a glass fibre mat in between.

During the production procedure of the compartment structure, the different layers are laminated by applying a high pressure and heat. After lamination and hardening, the resulting compartment, which comprises the sensor, may be further processed. This further processing may comprise varnishing or further lamination steps.

The capacitive sensor may be used as an invisible switch integrated into the cabin structure, in particular as special designed light switches in toilets or other passenger areas. Furthermore, the sensor may be used as an invisible switch for opening compartments, which are only used by the cabin crew. Furthermore, the sensor may be used as a switch for controlling the cockpit door locking system.

It should be noted, that the sensor may also be used in areas which are subject to extreme physical conditions, such as heat or moisture.

The embodiments of the control means described above may allow for having a motorized luggage compartment that is operated in the same manner as a manual luggage compartment. The user may thus very naturally use this luggage compartment, possibly without even noticing that this compartment is motorized. The means described above may even be used to measure the force exerted by the user of the luggage compartment. Thus, the assist mechanism, when it is motorized, may be driven according to the force exerted by the user on the mobile part of the luggage compartment.

Figure 7:
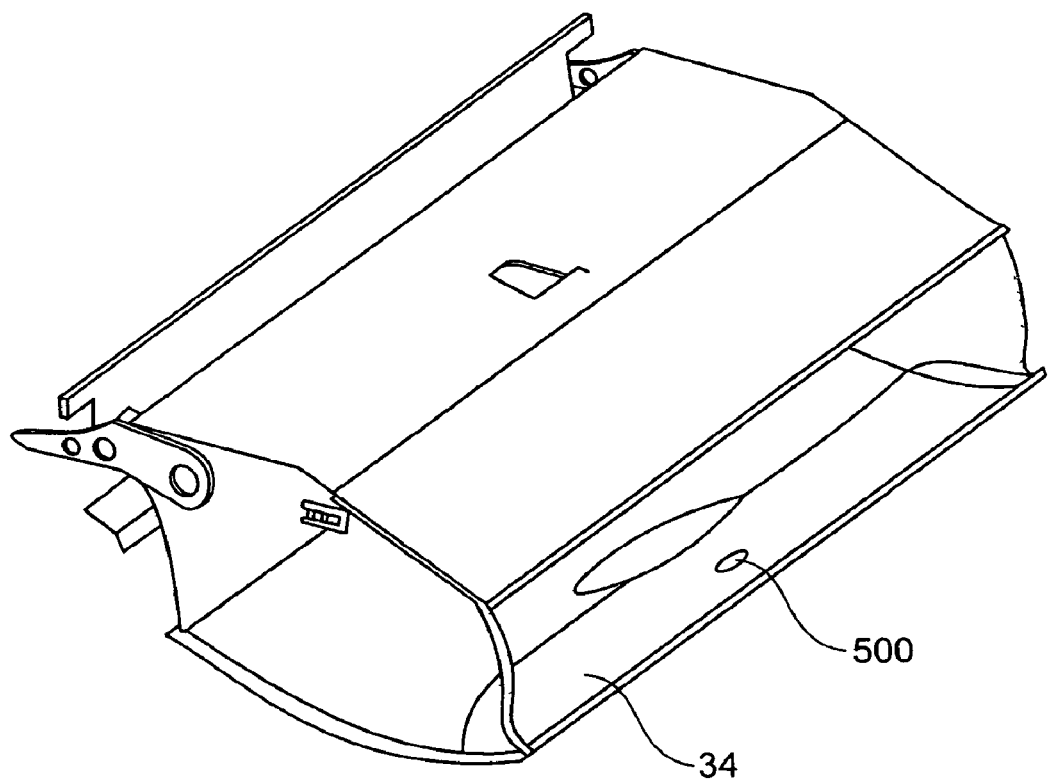
FIG. 7 shows a luggage compartment according to an exemplary embodiment of the present invention.

FIG. 7 shows a luggage compartment according to an exemplary embodiment of the present invention, comprising a sensor layer 34 and an electronic box 500 adapted for providing a voltage to the capacitive sensor and for analyzing an electric field generated by the capacitive sensor, wherein the electric field corresponds to the event.

It should be noted, that the present invention is not limited to the embodiments described above by way of non-limiting examples. The invention may also relate to all variations of embodiment that are within reach of a person skilled in the art of the following claims.

The sensors described are given by way of non-limiting examples. Here it matters that these sensors are distinguished from an "on/off" type button. The signal emitted by these sensors indicates if the user exerts a force on the mobile part of the luggage compartment or not.

The description was made with relation to a luggage compartment whose mobile part is a pivoting part. Of course, the invention may also be applied to luggage compartments presenting different kinematics.

The form and size of the sensors may be different from the form proposed and may be adapted to the respective application in aircrafts, cars, buses, trains or furniture. Also, such sensor may be applied as hidden switch or design switch e.g. in laptops or other electrical devices. The first embodiment proposes two sensors located on both sides of the handle of the luggage compartment. It is possible to provide a larger number of sensors. In a second embodiment, the entire exterior surface of the luggage compartment is covered by a sensor. An intermediate solution with a sensor covering for example half or a third of the lower surface of the luggage compartment may of course also be possible.

It should be noted, that, according to an aspect of the present invention, the assist mechanism or control mechanism may be adapted as an electrical motor, as a pneumatic or hydraulic mechanism or as a gas cylinder.

It should be noted, that the term "comprising" does not exclude other elements or steps and the "a" or "an" does not exclude a plurality and that a single processor or system may fulfil the functions of several means recited in the claims. Also elements described in association with different embodiments may be combined.

It should also be noted, that any reference signs in the claims shall not be construed as limiting the scope of the claims.

The invention claimed is:

1. A control device for closing a luggage compartment, the control device comprising:
   a detection unit;
   a control mechanism;
   a mobile part, adapted to move between an open position and a closed position;

wherein the detection unit is adapted to detect a first event triggered by a user and to transmit a first control signal to the control mechanism;

wherein the first control signal corresponds to the first event;

wherein the control mechanism is adapted to close the mobile part;

wherein closing of the luggage compartment is triggered by the first control signal; and wherein the detection unit is disposed at the bottom of a groove and in that a rest bar is elastically mounted in the groove in such a way that it acts on the detection unit when pressure is exerted on it.

2. The control device of claim 1, wherein the first event is one of a pressure signal applied to a zone and an approach of a user;

wherein the mobile part comprises an opening for loading luggage and a lower outside surface;

wherein the zone corresponds to the lower outside surface of the mobile part; and wherein the detection unit is arranged at a level corresponding to the lower outside surface of the mobile part.

3. The control device of claim 1, wherein the detection unit is further adapted to detect a second event and to transmit a second control signal to the mechanism;

wherein the second control signal corresponds to the second event;

wherein the mechanism is further adapted to open the luggage compartment; and wherein opening of the luggage compartment is triggered by the second control signal.

4. The control device according to claim 1, wherein the detection unit extends longitudinally with relation to the opening of the mobile part on a length corresponding to at least half of the width of the luggage compartment and near the opening of the mobile part.

5. The control device according to claim 1, wherein the detection unit comprises a pressure sensor chosen from among a set of resistive and capacitive sensors.

6. The control device according to claim 1, wherein the rest bar is presented in the form of a roughly rectangular section shaped piece with an interior surface designed to act on the detection unit, an exterior surface opposite from the interior surface on which a user may exert pressure and two lateral surfaces, in that the lateral surfaces each carry a flange extending longitudinally, and in that the sides of the groove receiving the rest bar each present a housing in which a flange of the rest bar is positioned.

7. The control device according to claim 1, characterized in that a printed circuit is housed in the bottom of the groove, and in that the interior surface of the rest bar is conductive, the conductive surface being at a distance from the printed circuit when no pressure is exerted on the rest bar.

8. An airplane, comprising a luggage compartment with the control device of claim 1.

9. A control device for closing a luggage compartment, the control device comprising:

a detection unit;

a control mechanism;

a mobile part, adapted to move between an open position and a closed position;

wherein the detection unit is adapted to detect a first event triggered by a user and to transmit a first control signal to the control mechanism;

wherein the first control signal corresponds to the first event;

wherein the control mechanism is adapted to close the mobile part;

wherein closing of the luggage compartment is triggered by the first control signal;

wherein the detection unit covers the major part of the lower exterior surface of the mobile part; and wherein the detection unit is presented in the form of a film.

10. The control device according to claim 9, wherein the film is electrically insulated from the lower exterior surface of the mobile part by a layer of insulating material and is covered by a decorative layer.

11. An airplane, comprising a luggage compartment with the control device of claim 9.

12. A luggage compartment adapted for being arranged overhead, the luggage compartment comprising a mobile part movable between an open position and a closed position and a control mechanism for acting on said mobile part to promote its closing, wherein the compartment comprises a detection unit adapted to act on said control mechanism by detecting a first event triggered by a user and transmitting a first control signal to said control mechanism; and wherein the detection unit is disposed at the bottom of a groove and in that a rest bar is elastically mounted in the groove in such a way that it acts on the detection unit when pressure is exerted on it.

13. A luggage compartment adapted for being arranged overhead, the luggage compartment comprising a mobile part movable between an open position and a closed position and a control mechanism for acting on said mobile part to promote its closing, wherein the compartment comprises a detection unit adapted to act on said control mechanism by detecting a first event triggered by a user and transmitting a first control signal to said control mechanism;

wherein the detection unit covers the major part of the lower exterior surface of the mobile part; and wherein the detection unit is presented in the form of a film.

* * * * *